United States Patent
Woo (10) Patent No.: US 6,217,432 B1
(45) Date of Patent: Apr. 17, 2001

(54) ABRASIVE ARTICLE COMPRISING A BARRIER COATING

(75) Inventor: Edward J. Woo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/080,936

(22) Filed: May 19, 1998

(51) Int. Cl.$^7$ .................................................. B24D 11/02
(52) U.S. Cl. .................... 451/534; 451/536; 451/539; 51/298
(58) Field of Search ........................... 451/533, 539; 51/295, 298, 297; 510/223; 525/227, 327.4; 526/227; 428/40.9; 156/307.7

(56) References Cited

U.S. PATENT DOCUMENTS

| | | |
|---|---|---|
| 1,565,027 | 12/1925 | Okie . |
| 1,581,657 | 4/1926 | Okie . |
| 1,635,801 | 12/1927 | Okie . |
| 1,759,168 | 5/1930 | Okie . |
| 1,775,631 | 9/1930 | Carlton . |
| 1,910,444 | 5/1933 | Nicholson . |
| 2,013,925 | 9/1935 | Okie . |
| 2,030,743 | 2/1936 | Carlton . |
| 2,186,001 | 1/1940 | Bartling . |
| 2,202,765 | 5/1940 | Guth . |
| 2,219,263 | 10/1940 | Okie . |
| 2,226,553 | 12/1940 | Cross . |
| 2,230,934 | 2/1941 | Carlton et al. . |
| 2,287,060 | 6/1942 | Oakes . |
| 2,307,461 | 1/1943 | Guth . |
| 2,309,108 | 1/1943 | Hatch . |
| 3,041,156 | 6/1962 | Rowse et al. . |
| 3,594,865 | 7/1971 | Erb . |
| 3,605,349 | 9/1971 | Anthon . |
| 4,240,807 | 12/1980 | Xronzer . |
| 4,255,164 | 3/1981 | Butzke et al. . |
| 4,311,489 | 1/1982 | Kressner . |
| 4,314,827 | 2/1982 | Leitheiser et al. . |
| 4,457,766 | 7/1984 | Caul . |
| 4,474,928 | 10/1984 | Hoenig et al. . |
| 4,536,453 | 8/1985 | Mauri et al. . |
| 4,547,204 | 10/1985 | Caul . |
| 4,588,419 | 5/1986 | Caul et al. . |
| 4,623,364 | 11/1986 | Cottringer et al. . |
| 4,642,126 | 2/1987 | Zador et al. . |
| 4,644,703 | 2/1987 | Kaczmarek et al. . |
| 4,652,274 | 3/1987 | Boettcher et al. . |
| 4,652,275 | 3/1987 | Bloecher et al. . |
| 4,735,632 | 4/1988 | Oxman et al. . |

(List continued on next page.)

FOREIGN PATENT DOCUMENTS

| | | |
|---|---|---|
| 0 237 784 | 9/1987 | (EP) . |
| 1 497 656 | 1/1978 | (GB) . |
| 2 109 798 | 6/1983 | (GB) . |
| 56-126156 | 10/1981 | (JP) . |
| WO 93/12911 | 7/1993 | (WO) . |
| WO 95/03156 | 2/1995 | (WO) . |
| WO 95/22436 | 8/1995 | (WO) . |

(List continued on next page.)

*Primary Examiner*—David A. Scherbel
*Assistant Examiner*—George Nguyen
(74) *Attorney, Agent, or Firm*—Paul W. Busse (57) ABSTRACT

An abrasive article is formed having a barrier coating coextensive with and interposed between a backing and an abrasive coating. The hardened barrier coating essentially eliminates penetration of the abrasive coating into the backing, especially volatile materials. The barrier coating comprising as starting materials a water-borne resin that upon hardening forms a crystalline or semi-crystalline polymer, a major polyfunctional crosslinking agent, and at least one minor polyfunctional crosslinking agent. The minor polyfunctional crosslinking agent enhances the attachment of the abrasive coating to the barrier coating.

26 Claims, 1 Drawing Sheet

U.S. PATENT DOCUMENTS

| | | |
|---|---|---|
| 4,744,802 | 5/1988 | Schwabel . |
| 4,749,617 | 6/1988 | Canty . |
| 4,751,138 | 6/1988 | Tumey et al. . |
| 4,769,617 | 9/1988 | Mizuide . |
| 4,770,671 | 9/1988 | Monroe et al. . |
| 4,799,939 | 1/1989 | Bloecher et al. . |
| 4,818,794 * | 4/1989 | Denzinger et al. ............... 525/327.8 |
| 4,881,951 | 11/1989 | Wood et al. . |
| 4,886,859 * | 12/1989 | Denzinger et al. ............... 525/327.8 |
| 4,903,440 | 2/1990 | Larson et al. . |
| 4,950,696 | 8/1990 | Palazotto et al. . |
| 4,959,265 | 9/1990 | Wood et al. . |
| 4,985,340 | 1/1991 | Palazzotto et al. . |
| 4,997,461 | 3/1991 | Markhoff-Matheny et al. . |
| 5,009,675 | 4/1991 | Kunz et al. . |
| 5,011,508 | 4/1991 | Wald et al. . |
| 5,014,468 | 5/1991 | Ravipati et al. . |
| 5,042,991 | 8/1991 | Kunz et al. . |
| 5,077,870 | 1/1992 | Melbye et al. . |
| 5,085,671 | 2/1992 | Martin et al. . |
| 5,152,917 | 10/1992 | Pieper et al. . |
| 5,178,646 | 1/1993 | Barber, Jr. et al. . |
| 5,213,951 | 5/1993 | Delfino . |
| 5,236,472 | 8/1993 | Kirk et al. . |
| 5,256,170 | 10/1993 | Harmer et al. . |
| 5,304,223 | 4/1994 | Pieper et al. . |
| 5,342,419 | 8/1994 | Hibbard . |
| 5,344,688 | 9/1994 | Peterson et al. . |
| 5,368,618 | 11/1994 | Masmar et al. . |
| 5,368,619 | 11/1994 | Culler . |
| 5,378,252 | 1/1995 | Follensbee . |
| 5,417,726 | 5/1995 | Stout et al. . |
| 5,435,816 | 7/1995 | Spurgeon et al. . |
| 5,436,063 | 7/1995 | Follett et al. . |
| 5,437,754 | 8/1995 | Calhoun . |
| 5,453,312 | 9/1995 | Haas et al. . |
| 5,454,844 | 10/1995 | Hibbard et al. . |
| 5,470,368 | 11/1995 | Culler . |
| 5,498,670 * | 3/1996 | Aoyama et al. ..................... 525/217 |
| 5,500,273 | 3/1996 | Holmes et al. . |
| 5,508,113 | 4/1996 | Knoerzer . |
| 5,523,152 | 6/1996 | Thurber et al. . |
| 5,527,368 | 6/1996 | Supkis et al. . |
| 5,549,961 | 8/1996 | Haas et al. . |
| 5,551,960 | 9/1996 | Christianson . |
| 5,565,011 | 10/1996 | Follett et al. . |
| 5,571,297 | 11/1996 | Swei et al. . |
| 5,582,672 | 12/1996 | Follett et al. . |
| 5,624,471 | 4/1997 | Gaeta et al. . |
| 5,632,668 | 5/1997 | Lindholm et al. . |
| 5,656,646 * | 8/1997 | Perner et al. ......................... 510/361 |
| 5,674,122 | 10/1997 | Krech . |
| 5,714,259 | 2/1998 | Holmes et al. . |
| 5,891,294 * | 4/1999 | Shih et al. .......................... 156/307.7 |
| 5,981,011 * | 11/1999 | Overcash et al. ................... 428/40.9 |
| B1 4,773,920 | 5/1995 | Chasman et al. . |

FOREIGN PATENT DOCUMENTS

| | | |
|---|---|---|
| WO 96/09141 | 3/1996 | (WO) . |
| WO 96/20832 | 7/1996 | (WO) . |
| WO 96/27189 | 9/1996 | (WO) . |
| WO 97/06926 | 2/1997 | (WO) . |
| WO 97/12727 | 4/1997 | (WO) . |

* cited by examiner

ABRASIVE ARTICLE COMPRISING A BARRIER COATING

FIELD OF THE INVENTION

This invention relates to an abrasive article having a barrier coating coextensive and interposed between a backing and an abrasive coating. The barrier coating prevents components of a flowable abrasive composition from penetrating into a backing.

Some conventional coated abrasive articles have a "make coat" of binder material that secures abrasive particles to a backing. In addition to a "make coat", a "size coat" of binder material may be placed over the abrasive particles further securing the abrasive particles to the backing. Other coated abrasive articles contain a single abrasive composite layer made from abrasive slurry applied to a backing. Abrasive slurries typically contain abrasive particles dispersed in a radiation or a thermally curable binder precursor and are hardened to form the abrasive composite layer. Both conventional coated and abrasive composite layered abrasive articles are made by applying an abrasive composition in an unhardened, flowable state to the surface of a backing. The abrasive composition is then hardened to form an abrasive coating while in association with a backing.

During manufacture of abrasive articles, components of an abrasive composition may penetrate a backing. Low molecular weight components typically penetrate a backing quicker than higher molecular weight precursors. The unhardened precursors may become trapped in the backing and during hardening are obscured from proper light activation needed for polymerization. Unhardened components remaining in the manufactured abrasive articles may cause portions of abrasive coatings to become dislodged from a backing during use due to poor adherence of abrasive coatings to backings. In addition, having unhardened components penetrate a backing will alter the final composition of the abrasive coating.

Abrasive articles may include additional components such as chemical pretreating agents rendering paper backings waterproof. In recent years, waterproofing agents have switched from a solvent based (sometimes referred to as an oil based treatment) to a water based or latex treatment system. This change from solvent to water based treatments has been facilitated for environmental reasons, such as reducing or eliminating handling and disposal of organic solvents. During the manufacture of abrasive articles, and prior to hardening of abrasive coatings, components of a particular abrasive coating may penetrate into a backing treatment. This penetration may cause swelling of the waterproof treatment or agent. This swelling is likely to decrease the adherence of abrasive coatings to backings causing premature release of abrasive coatings, generally referred to in the abrasive industry as "shelling". "Shelling" has been known to significantly reduce the effectiveness of abrasive articles during abrading processes.

Certain components of abrasive coatings are highly volatile and/or odorous, making manufacture of abrasive articles difficult. Such volatile and/or odorous components may likely become non-volatile and non-odorous when hardened. If the volatile and/or odorous components penetrate into a backing prior to hardening, they may remain as volatile and/or odorous components in the finished abrasive article. Such volatile and/or odorous components are unpleasant to smell and may volatilize during use of the abrasive article. The unhardened abrasive coating components may cause irritation if such materials come in contact with the skin.

SUMMARY OF THE INVENTION

Abrasive articles of the present invention have a backing, an abrasive coating, and a barrier coating. The abrasive coating is formed from radiation and/or thermally curable binder precursor and typically includes abrasive particles dispersed within the binder precursor. An abrasive coating may be in the form of an abrasive composite layer, a "make" coat, or a "size" coat. One of the starting materials of the abrasive coating may be volatile and/or odorous, such as tetrahydrofurfuryl acrylate. Tetrahydrofurfuryl acrylate normally becomes essentially nonvolatile and non-odorous when polymerized into a network. Application of an unhardened or flowable abrasive composition to a backing may result in volatile precursor monomer, such as tetrahydrofurfuryl acrylate, penetrating into the backing and remaining unhardened in the finished abrasive article. It is undesirable to have unhardened tetrahydrofurfuryl acrylate as part of a backing because unhardened tetrahydrofurfuryl acrylate monomer is a skin irritant. The barrier coating of the present invention prevents tetrahydrofurfuryl acrylate from entering the backing upon the application of an unhardened or flowable abrasive composition to a backing. Essentially all tetrahydrofurfuryl acrylate is then able to polymerize into a nonvolatile polymer during the hardening of the abrasive composition.

The barrier coating is formed from a water-borne composition comprising a crystalline or semi-crystalline resin, a major polyfunctional crosslinking agent having acid functionality, and at least one minor polyfunctional crosslinking agent. The barrier coating is coextensive with and interposed between the abrasive coating and the backing and essentially eliminates penetration of components of the hardened or flowable abrasive composition into the backing. The minor polyfunctional crosslinking agent is a component of the barrier coating that enhances attachment of the abrasive coating to the barrier coating.

The invention also embodies a method of making an abrasive article. The first step is preparing a water-borne composition to a backing. The composition includes a crystalline or semi-crystalline resin, one major polyfunctional crosslinking agent, and one minor polyfunctional crosslinking agent. The water-borne composition is applied to a backing and then partially or fully hardened to form a barrier coating. An abrasive composition typically comprising a binder and abrasive particles is applied over the barrier coating. The abrasive composition is hardened in contact with the barrier coating to form an abrasive coating. During the hardening process, chemical crosslinking at the interfacial boundary between the two coating layers is thought to occur.

The following definitions are used throughout this patent proposal: "Abrasive coating" refers both to a hardened coating comprising an abrasive composite layer(s) and to a hardened coating that comprises a make and/or a size coating.

"Abrasive composite structures" refers to one of a plurality of shaped bodies which can collectively provide a three-dimensional abrasive coating formed from a matrix of abrasive particles dispersed in a binder precursor.

"Precisely shaped" refers to an abrasive composite structure that has a distinct and discernible shape associated with it. This shape may be a geometric shape, random shape or combination thereof. In one embodiment, a precisely shaped abrasive composite is formed by solidifying a binder precursor in the cavities of a tooling. Additional information on precisely shaped abrasive composites can be found in U.S. Pat. No. 5,152,917 (Pieper et al.), incorporated herein after by reference.

"Saturant" refers to a polymeric material, such as a water-proofing agent, applied to a backing prior to the application of a barrier coating.

"Attachment Complex" refers to crosslinking of compounds at or near the interface of the abrasive coating and the barrier coating by a chemical reaction in which the reactants include the minor polyfunctional crosslinking agent of the barrier precursor coating and at least one component of the adjoining coating.

"Volatile" refers to low molecular weight binder precursor components that evaporate readily at normal temperatures and pressures.

"Major" when used to describe the amount of a component in a composition or an article refers to greater than 50 weight percent.

"Minor" when used to describe the amount of a component in a composition or an article refers to less than 50 weight percent.

"Substantially Crystalline" when used to describe a polymer refers to a crystalline or semi-crystalline polymer.

"Water-borne" refers to a composition being dissolved in or dispersed in water. "Hardening" when used to describe the solidification of a precursor refers to curing (e.g., polymerization and/or cross-linking), by drying (e.g., driving off a volatile solvent) and/or simply by cooling.

DETAILED DESCRIPTION

Most conventional coated abrasive articles are free of barrier coatings. Such abrasive articles may have restricted durability and surface modification characteristics. In addition, if the abrasive article contains an unhardened component, an undesirable odor may evolve during use of the article, and the unhardened component may cause skin irritation if the unhardened component comes in contact with the skin.

The abrasive article of the present invention includes a barrier coating that essentially eliminates the penetration into a backing of components of an abrasive composition applied to a backing. The components on the surface of the backing are then able to harden with few, if any unhardened components being trapped in the backing. The minor polyfunctional crosslinking agent associated with the barrier coating enhances the attachment of the abrasive coating to the barrier coating. Chemical reactions occurring between the components of the flowable abrasive composition and the minor polyfunctional crosslinking agent in the barrier coating may involve a condensation reaction that is expected to form attachment complexes that attach the abrasive coating to the backing. An example of such a condensation reaction is illustrated below.

A barrier coating of the present invention may contain more than one minor polyfunctional crosslinking agent. The minor polyfunctional crosslinking agent is a component essentially of the barrier coating. The term "essentially" refers to the minor polyfunctional crosslinking agent being an exclusive component of only the barrier coating with the understanding that a smaller amount of the minor polyfunctional crosslinking agent may be associated with the other coatings.

Abrasive Articles

The abrasive articles of the present invention include an abrasive coating, a backing, and a barrier coating. There are many possible embodiments of the invention. The following sections of the patent application will describe, in part, the elements of the invention.

Barrier Coatings

The barrier coating is formed from a water-borne composition comprises an essentially crystalline or semi-crystalline resin, a major polyfunctional cross-linking agent having acid functionality, and a minor cross-linking agent. The water-borne composition is typically substantially free of abrasive particles. Suitable resins for preparing the water-borne composition include polyvinyl alcohol, polyacrylonitrile, poly(acrylonitrile-co-styrene), poly (acrylonitrile-co-methylacrylate-co-butadiene), poly (methacrylonitrile-co-styrene), polyvinylidene chloride, and combinations thereof. The resins were chosen for their ability to be part of a water-borne composition and because of their semi-crystalline or crystalline nature. The water-borne composition hardens (partially or substantially) while in contact with the backing by drying at temperatures typically between 100° C. and 120° C. The barrier coating formed is substantially water resistant.

The barrier coating includes, in addition to a resin, a major polyfunctional crosslinking agent having acid functionality. Suitable major polyfunctional crosslinking agents include vinyl ether maleic anhydride copolymer, commercially available as GANTREZ 169, sold by International Specialty Product (ISP), Wayne, N.J. Some suitable major polyfunctional crosslinking agents include polymaleic acid, polystyrenesulfonic acid/maleic acid copolymer. Additional polyfunctional crosslinking agents include a maleic anhydride copolymer such as polyvinylmethylether-co-maleic anhydride, polymaleic anhydride, polyazelaic anhydride, and combinations thereof. Typically, the anhydrides hydrolyze when placed in water to form an acid functionality.

The resulting crosslinked barrier coating may comprise about 50 to 99.5 percent by weight crosslinked resin and 0.5 to 50 percent by weight of a major polyfunctional crosslinking agent. Preferably, the crosslinked barrier coating may comprise about 75 to 95 percent by weight crosslinked resin and 5 to 25 percent by weight of the major polyfunctional crosslinking agent.

In addition to the major crosslinking agent, the barrier coating includes a minor polyfunctional crosslinking agent that enhances the attachment of the abrasive coating to the backing. The amount of attachment of one coating to another was measured by Test Procedure II For Measuring The Release Of Hardened Abrasive Composite From A Production Tool as described in Example section of this patent application. Minor polyfunctional crosslinking agents used in this invention were selected on their ability to enhance attachment of the abrasive coating to a barrier coated backing, and in part, on their ability to be compatible with carboxylated copolymeric resins.

Suitable minor polyfunctional crosslinking agents include: polyethyleneimine, polyaziridines such as trimethylol-tris[beta-(N(methylazirdinyl))]-propionate), polyoxazolines such as poly-2-ethyl-2-oxazoline, polyvinylpyridine, polyaniline, polyazalactone, and acrylate modified aziridine monomers (which can be copolymerized with an acrylate monomer by an ultraviolet light hardening process). The most preferred minor polyfunctional crosslinking agents are polyaziridines such as those disclosed in U.S. Pat. No. 4,769, 617 (Canty), incorporated herein by reference. Canty, unlike the present invention, reports that an aziridine-containing layer is made of organic resins that are essentially amorphous (i.e., non-crystalline). The barrier coating of the present invention contains aziridine. The barrier coating is formed from semi-crystalline or crystalline resins that upon hardening prevent the components of a flowable abrasive composition from entering a backing. The aziridine of the barrier coating enhances the attachment of the abrasive coating to a treated backing. The amount of minor polyfunctional crosslinking agent(s) added to the barrier coating may be within the range of 0.5 to 20 weight percent of the coating weight. It is preferred that the minor polyfunctional crosslinking agent(s) be within the range of 1 to 10 weight percent of the coating weight. It is most preferred that the minor polyfunctional crosslinking agent(s) be within the range of 1 to 5 weight percent of the coating weight. The minor polyfunctional crosslinking agent always comprises a lower weight percent of the total barrier coating than the major polyfunctional crosslinking agent. A minor polyfunctional crosslinking agent of the barrier coating may react with components within the coating, or the components of an adjoining coating. When the minor polyfunctional crosslinking agent reacts with components of the adjoining coating, it is thought that attachment complexes are formed at the boundary between the abrasive coating and the barrier coating.

A non-functional water dispersible polymer resin with good organic solvent barrier performance may also be included in the barrier coating such as polyacrylonitrile, polyamide, and polyazalactone. A non-functional polymer resin refers to a polymer resin with or without functional groups such that the resin does not participate in the polymerization reaction of the coating.

The barrier coating precursor further comprises water, this water can be tap water, distilled water or deionized water.

The amount of water can vary by weight, for example, the barrier coating precursor can range from about 1 to 95 percent by weight water, typically 5 to 50 percent by weight water and preferably 5 to 25 percent by weight water.

The barrier coating precursor may optionally contain an organic solvent. The organic solvent may aid in dispersibility, coating rheology, coating properties or adhesion properties. The amount of organic solvent is relatively small in comparison to the water. It is preferred however, that the barrier coating precursor be essentially free of organic solvent due to the environmental concerns associated with air pollution and the disposal of the solvent.

The barrier coating precursor may further comprise optional additives such as wetting agents, surfactants, dyes, pigments, hardening agents, plasticizer, fillers, coupling agents and the like.

Binders

The abrasive coating of this invention is formed from an abrasive composition capable of flowing sufficiently so as to coat a surface. The abrasive composition includes a curable organic binder precursor. Hardening of the binder precursor may be achieved by curing (e.g., polymerization and/or cross-linking), by drying (e.g., driving off a liquid) and/or simply by cooling. Both thermoplastic and/or thermosetting polymers, or materials, as well as combinations thereof, maybe used as binder precursor. The hardening of the abrasive composition forms a hard abrasive coating. The binder precursor may be a condensation curable resin or an additional polymerizable resin.

An abrasive composition may comprise by weight, 100 percent binder precursor, between about 1 part abrasive particles to 90 parts abrasive particles and 10 parts binder precursor to 99 parts binder precursor. Preferably, an abrasive composition may comprise about 30 to 85 parts abrasive particles and about 15 to 70 parts binder precursor. More preferably an abrasive composition may comprise about 40 to 70 parts abrasive particles and about 30 to 60 parts binder precursor.

The binder precursors are preferably a curable organic material (i.e., a polymer subunit or material capable of polymerizing and/or crosslinking upon exposure to heat and/or other sources of energy, such as electron beam, ultraviolet light, visible light, etc., or with time upon initiation by a chemical catalyst, photoinitiator, moisture, or other agent which cause the polymer to harden or polymerize). Binder precursor examples include amino polymers or aminoplast polymers such as alkylated urea-formaldehyde polymers, melamine-formaldehyde polymers, and alkylated benzoguanamine-formaldehyde polymer; acrylate (both acrylates and methacrylates) such as alkyl acrylates, acrylated epoxies, acrylated urethanes, acrylated polyesters, acrylated polyethers, acrylated oils, and acrylated silicones; vinyl ether monomers or oligomers; alkyd polymers such as urethane alkyd polymers, polyester polymers, reactive urethane polymers, phenolic polymers such as resole and novolac resins, phenolic/latex blends, epoxy polymers such as bisphenol epoxy resins, isocyanates, isocyanurates, polysiloxane polymers including alkylalkoxysilane polymers. The resulting binder precursor may be in the form of monomers, oligomers, polymers, or combinations thereof.

The aminoplast binder precursors have at least one pendant alpha, beta-unsaturated carbonyl group per molecule or oligomer. These polymer materials are further described in U.S. Pat. Nos. 4,903,440 (Larson et al.) and 5,236,472 (Kirk et al.), both incorporated herein by reference.

Preferred hardened abrasive coatings are generated from free radical curable binder precursors. These binder precursors are capable of polymerizing rapidly upon an exposure to thermal energy and/or radiation energy. Examples of ethylenically unsaturated binder precursors include aminoplast monomers or oligomers having pendant alpha, beta unsaturated carbonyl groups, ethylenically unsaturated monomers or oligomers, acrylated isocyanurate monomers, acrylated urethane oligomers, acrylated epoxy monomers or oligomers, ethylenically unsaturated monomers or diluents, acrylate dispersions, and mixtures thereof. The term acrylate includes both acrylates and methacrylates.

Ethylenically unsaturated binder precursors include both monomeric and polymeric compounds that contain atoms of carbon, hydrogen and oxygen, and optionally, nitrogen and the halogens. Oxygen or nitrogen atoms or both are generally present in the form of ether, ester, urethane, amide, and urea groups. The ethylenically unsaturated monomers may be monofunctional, difunctional, trifunctional, tetrafunctional or even higher functionality, and include both acrylate and methacrylate-based monomers. Suitable ethylenically unsaturated compounds are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, or maleic acid. Representative examples of ethylenically unsaturated monomers include methyl acrylate, ethyl acrylate, methyl methacrylate, ethyl methacrylate, styrene, divinylbenzene, hydroxyethyl acrylate, hydroxyethyl methacrylate, hydroxypropyl acrylate, hydroxy propyl methacrylate, hydroxybutyl acrylate, hydroxybutyl methacrylate, lauryl acrylate, octyl acrylate, caprolactone acrylate, caprolactone methacrylate, tetrahydrofurturyl acrylate, tetrahydrofurfuryl methacrylate, cyclohexyl acrylate, stearyl acrylate, 2-phenoxyethyl acrylate, isooctyl acrylate, isobornyl acrylate, isodecyl acrylate, polyethylene glycol monoacrylate, polypropylene glycol monoacrylate, vinyl toluene, ethylene glycol diacrylate, polyethylene glycol diacrylate, ethylene glycol dimethacrylate, hexanediol diacrylate, triethylene glycol diacrylate, 2 (2-ethoxyethoxy) ethyl acrylate, propoxylated trimethylol propane triacrylate, trimethylolpropane triacrylate, glycerol triacrylate, pentaerythyitol triacrylate, pentaerythritol trimethacrylate, pentaerythritol tetraacrylate and pentaerythritol tetramethacrylate. Other ethylenically unsaturated materials include monoallyl, polyallyl, or polymethallyl esters and amides of carboxylic acids, such as diallyl phthalate, diallyl adipate, or N,N-diallyladipamide. Still other nitrogen containing ethylenically unsaturated monomers include tris(2-acryloxyethyl)isocyanurate, 1,3,5-tri(2-methyacryloxyethyl)-s-triazine, acrylamide, methylacrylamide, N-methylacrylamide, N,N-dimethylacrylamide, N-vinyl-pyrrolidone, N-vinyl-piperidone, and 3-aziridinyl-propoxy acrylate.

A preferred binder precursor contains a blend of two or more acrylate monomers. For example, the binder precursor may be a blend of trifunctional acrylate and monofunctional acrylate monomers. An example of one binder precursor is a blend of propoxylated trimethylol propane triacrylate and 2 (2-ethoxyethoxy) ethyl acrylate. The weight ratios of multifunctional acrylate and monofunctional acrylate polymers may range from about 1 part to about 90 parts multifunctional acrylate to about 10 parts to about 99 parts monofunctional acrylate.

It is also feasible to formulate a binder precursor from a mixture of an acrylate and an epoxy polymer, e.g., as described in U.S. Pat. No. 4,751,138 (Tumey et al.), incorporated herein by reference.

Other binder precursors include isocyanurate derivatives having at least one pendant acrylate group and isocyanate derivatives having at least one pendant acrylate group are further described in U.S. Pat. No. 4,652,274 (Boettcher et al.), incorporated herein by reference. The preferred isocyanurate material is the triacrylate of tris(hydroxyethyl) isocyanurate.

Still other binder precursors include diacrylate urethane esters as well as polyacrylate or poly methacrylate urethane esters of hydroxy terminated isocyanate extended polyesters or polyethers. Examples of commercially available acrylated urethanes include UVITHANE 782, sold by Morton International Inc., Chicago, Ill.; CMD 6600, CMD 8400, and CMD 8805, sold by UCB Radcure Specialties, Smyrna, Ga.; PHOTOMER resins (e.g., PHOTOMER 6010), sold by Henkel Corp., Hoboken, N.J.; EBECRYL 220 (hexafunctional aromatic urethane acrylate), EBECRYL 284 (aliphatic urethane diacrylate of 1200 molecular weight diluted with 1,6-hexanediol diacrylate), EBECRYL 4827 (aromatic urethane diacrylate), EBECRYL 4830 (aliphatic urethane diacrylate diluted with tetraethylene glycol diacrylate), EBECRYL 6602 (trifunctional aromatic urethane acrylate diluted with trimethylolpropane ethoxy triacrylate), EBECRYL 840 (aliphatic urethane diacrylate), and EBECRYL 8402 (aliphatic urethane diacrylate), sold by UCB Radcure Specialties, Smyrna, Ga.; and SARTOMER resins (e.g., SARTOMER 9635, 9645, 9655, 963-B80, 966-A80, CN980M50, etc.), sold by Sartomer Company, Exton, Pa.

Yet other binder precursors include diacrylate epoxy esters as well as polyacrylate or polymethacrylate epoxy ester such as the diacrylate esters of bisphenol A epoxy resin. Examples of commercially available acrylated epoxies include CMD 3500, CMD 3600, and CMD 3700, sold by UCB Radcure Specialties, Smyrna, Ga.

Other binder precursors may also be acrylated polyester polymers. Acrylated polyesters are the reaction products of acrylic acid with a dibasic acid/aliphatic diol-based polyester. Examples of commercially available acrylated polyesters include PHOTOMER 5007 (hexafunctional acrylate), and PHOTOMER 5018 (tetrafunctional tetracrylate), sold by Henkel Corp., Hoboken, N.J.; and EBECRYL 80 (tetrafunctional modified polyester acrylate), EBECRYL 450 (fatty acid modified polyester hexaacrylate), and EBECRYL 830 (hexafunctional polyester acrylate), sold by UCB Radcure Specialties, Smyrna, Ga.

Another preferred binder precursor is a blend of ethylenically unsaturated oligomer and monomers. For example the binder precursor may comprise a blend of an acrylate functional urethane oligomer and one or more monofunctional acrylate monomers. This acrylate monomer may be a pentafunctional acrylate, tetrafunctional acrylate, trifunctional acrylate, difunctional acrylate, monofunctional acrylate polymer, or combinations thereof.

The binder precursor may also be an aqueous acrylate dispersion like that described in U.S. Pat. No. 5,378,252 (Follensbee), incorporated herein by reference.

In addition to thermosetting polymers, thermoplastic binders may also be used. Examples of suitable thermoplastic polymers include polyamides, polyethylene, polypropylene, polyesters, polyurethanes, polyetherimide, polysulfone, polystyrene, acrylonitrile-butadiene-styrene block copolymers, styrene-butadiene-styrene block copolymers, styrene-isoprene-styrene block copolymers, acetal polymers, polyvinyl chloride and combinations thereof.

Examples of useable crosslinkable materials include phenolic resins, bismaleimide binders, vinyl ether resins, aminoplast resins having pendant alpha, beta unsaturated carbonyl groups, urethane resins, epoxy resins, acrylate resins, acrylated isocyanurate resins, urea-formaldehyde resins, isocyanurate resins, acrylated urethane resins, acrylated epoxy resins, or mixtures thereof.

Water-soluble binder precursors optionally blended with a thermosetting resin may be used. Examples of water-soluble binder precursors include polyvinyl alcohol, hide glue, or water-soluble cellulose ethers such as hydroxypropylmethyl cellulose, methyl cellulose or hydroxyethylmethyl cellulose. These binders are reported in U.S. Pat. No. 4,255,164 (Butkze et al.), incorporated herein by reference.

In the case of binder precursor containing ethylenically unsaturated monomers and oligomers, polymerization initiators may be used. Examples include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, or mixtures thereof. Examples of suitable commercially available, ultraviolet-activated photoinitiators include IRGACURE 651 and IRGACURE 184, sold by Ciba Geigy Specialty Chemicals, Tarrytown, N.Y.; and DAROCUR 1173, sold by E. Merck, Germany. Another visible light-activated photoinitiator includes IRGACURE 369, sold by Ciba Geigy Specialty Chemicals, Tarrytown, N.Y.

Examples of suitable visible light-activated initiators are reported in U.S. Pat. No. 4,735,632 (Oxman et al.) and U.S. Pat. No. 5,674,122 (Klun et al.).

A suitable initiator system may include a photosensitizer. Representative photosensitizers may have carbonyl groups or tertiary amino groups or mixtures thereof. Preferred photosensitizers having carbonyl groups are benzophenone, acetophenone, benzil, benzaldehyde, o-chlorobenzaldehyde, xanthone, thioxanthone, 9,10-anthraquinone, or other aromatic ketones. Preferred photosensitizers having tertiary amines are methyldiethanolamine, ethyldiethanolamine, triethanolamine, phenylmethyl-ethanolamine, or dimethylaminoethylbenzoate. Suitable commercially available photosensitizers include QUANTICURE ITX, QUANTICURE QTX, QUANTICURE PTX, and QUANTICURE EPD, sold by Aceto Chemical Co., Inc., Plushing, N.Y.

In general, the amount of the photosensitizer or photoinitiator system may vary from about 0.01 to 10 percent by weight, more preferably from 0.25 to 4.0 percent by weight of the components of the binder precursor.

Additionally, it is preferred to disperse (preferably uniformly) the initiator in the binder precursor before addition of any particulate material, such as the abrasive particles and/or filler particles.

In general, it is preferred that the binder precursor be exposed to radiation energy, preferably ultraviolet light or visible light, to harden or polymerize the binder precursor. In some instances, certain abrasive particles and/or certain additives will absorb ultraviolet and visible light, which may hinder proper hardening of the binder precursor. This occurs, for example, with ceria abrasive particles. The use of phosphate containing photoinitiators, in particular acylphosphine oxide containing photoinitiators, may minimize this problem. An example of such an acylphosphine oxide is 2,4,6-trimethylbenzoyldiphenylphosphine oxide known as LR8893, sold by BASF Corporation, Germany. Other examples of commercially available acylphosphine oxides include DAROCUR 4263 and DAROCUR 4265, sold by E. Merck, Germany.

Cationic initiators may be used to initiate polymerization when the binder is based upon an epoxy or vinyl ether. Examples of cationic initiators include salts of onium cations, such as arylsulfonium salts, as well as organometallic salts such as ion arene systems. Other examples are reported in U.S. Pat. No. 4,751,138 (Tumey et al.); 5,256,170 (Harmer et al.); U.S. Pat. No. 4,985,340 (Palazotto); and U.S. Pat. No. 4,950,696, all incorporated herein by reference.

Dual-hardening and hybrid-hardening photoinitiator systems may also be used. In dual-hardening photoinitator systems, hardening or polymerization occurs in two separate stages, via either the same or different reaction mechanisms. In hybrid-hardening photoinitiator systems, two hardening mechanisms occur at the same time upon exposure to ultraviolet/visible or electron-beam radiation.

The binder precursor may further comprise a hardening agent. A hardening agent is a material that helps to initiate and complete the polymerization or crosslinking process such that the binder precursor is converted into a binder. The term hardening agent encompasses initiators, photoinitiators, catalysts and activators. The amount and type of the hardening agent will depend largely on the chemistry of the binder precursor.

Polymerization of the preferred ethylenically unsaturated monomer(s) or oligomer(s) occurs via a free-radical mechanism. If the energy source is an electron beam, the electron beam generates free-radicals which initiate polymerization. However, it is within the scope of this invention to use initiators even if the binder precursor is exposed to an electron beam. If the energy source is heat, ultraviolet light, or visible light, an initiator may have to be present in order to generate free-radicals. Examples of initiators (i.e., photoinitiators) that generate free-radicals upon exposure to ultraviolet light or heat include, but are not limited to, organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Suitable commercially available photoinitiators that generate free radicals upon exposure to ultraviolet light include IRGACURE 651 and IRGACURE 184, sold by Ciba Geigy Specialty Chemicals, Tarrytown, New York; and DAROCUR 1173, sold by E. Merck, Germany. Typically, the initiator is used in amounts ranging from 0.1 to 10 percent, preferably 2 to 4 percent by weight, based on the weight of the binder precursor. Additionally, it is preferred to disperse, preferably uniformly disperse, the initiator in the binder precursor prior to the addition of any particulate material, such as the abrasive particles and/or filler particles.

Backing

A variety of backing materials are suitable for the abrasive article of the present invention, including both flexible backings and backings that are more rigid. Examples of typical flexible abrasive backings include cloth, paper, and treated versions thereof and combinations thereof. The thickness of a backing generally ranges between about 20 to 5,000 micrometers and preferably between 50 to 2500 micrometers.

Another example of a suitable backing is described in U.S. Pat. No. 5,417,726 (Stout et al.), incorporated herein by reference. The backing may also consist of two or more backings laminated together, as well as reinforcing fibers engulfed in a polymeric material as disclosed in PCT publication WO 93/12911 (Benedict et al.).

Types Of Abrasive Article

Figure 1:
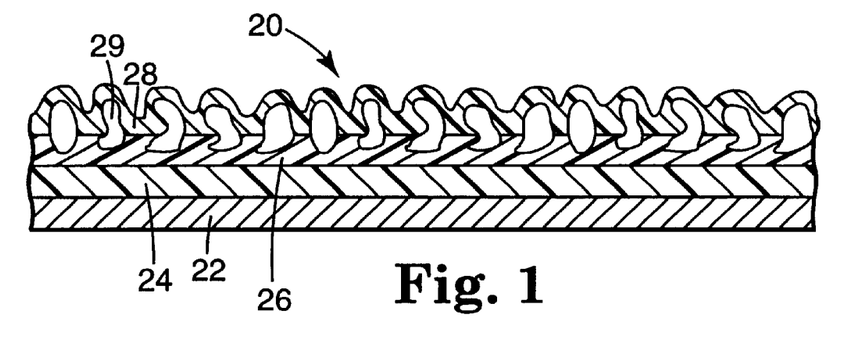
FIG. 1 is a cross sectional view of one abrasive article.

An abrasive article of the present invention may comprise a make and a size coat coextensive with a barrier coated backing. An example of a such an article is illustrated in FIG. 1. An abrasive article (20) contains a backing (22)

having a major surface on which is coated a layer of barrier coating (24). Although not illustrated in this example, the barrier coating may be provided on all sides of the backing. One or both of the major surfaces of the backing may be coated. On top of the major surface of the barrier coating (24) is a make coat (26) with abrasive particles (29). Overlaying the make coat (26) and the abrasive particles (29) is a size coat (28).

Figure 2:
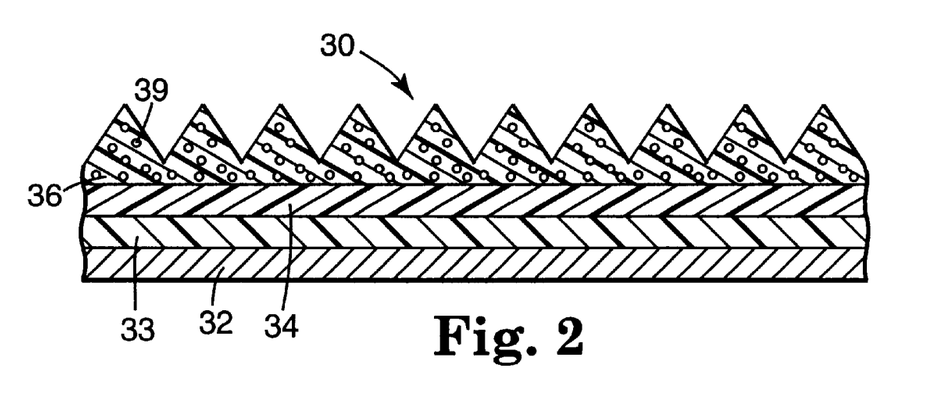
FIG. 2 is a cross sectional view of another abrasive article.

An abrasive article that contains an abrasive composite layer coextensive with a single backing or a multilayer backing may also contain a barrier coating. The abrasive composite layer may form an array of abrasive composite structures that provide a textured surface to a fixed abrasive article. An example of a textured fixed abrasive article having a barrier coating is illustrated in FIG. 2. Specifically, FIG. 2 illustrates an abrasive article (30) having a backing (32) with a major surface. Provided on the major surface of the backing (32) is a waterproofing agent (33). On top of the major surface of the waterproofing agent is a barrier coating (34). On top of the major surface of the barrier coating (34) is an abrasive composite layer (36) that includes binder and abrasive particles (39). This article has an abrasive composite layer comprising an array of precisely shaped abrasive composite structures. However, a fixed abrasive article may have a textured surface that forms an array of irregularly shaped abrasive composite structures or have a surface that is essentially smooth like a lapping coated abrasive article. In addition, a fixed abrasive article having a barrier coating may be substantially free of a water-proofing agent or chemical agent used to pre-treat a backing.

Abrasive Particles

An abrasive article of the present invention typically comprises at least one abrasive coating formed from an abrasive composition that includes a plurality of abrasive particles that are either dispersed or embedded in a binder precursor. The average particle size of the abrasive particles can range from about 0.01 to 1500 micrometers, typically between 0.01 and 500 micrometers, and most generally between 15 and 500 micrometers. The size of the abrasive particle is typically specified to be the longest dimension of the abrasive particle. In most cases there will be a range distribution of particle sizes. In some instances it is preferred that the particle size distribution be tightly controlled such that the resulting abrasive article provides a consistent surface finish on the workpiece being abraded.

Examples of conventional hard abrasive particles include fused aluminum oxide, heat treated aluminum oxide, white fused aluminum oxide, black silicon carbide, green silicon carbide, titanium diboride, boron carbide, tungsten carbide, titanium carbide, diamond (both natural and synthetic), silica, iron oxide, chromia, ceria, zirconia, titania, silicates, tin oxide, cubic boron nitride, garnet, fused alumina zirconia, sol gel abrasive particles and the like. Examples of sol gel abrasive particles can be found in U.S. Pat. No. 4,314,827 (Leitheiser et al.); U.S. Pat. No. 4,623,364 (Cottringer et al); U.S. Pat. No. 4,744,802 (Schwabel); U.S. Pat. No. 4,770,671 (Monroe et al.) and U.S. Pat. No. 4,881,951 (Wood et al.), all incorporated herein after by reference.

The term abrasive particle, as used herein, also encompasses single abrasive particles bonded together with a polymer to form an abrasive agglomerate. Abrasive agglomerates are further described in U.S. Pat. No. 4,311,489 (Kressner); U.S. Pat. No. 4,652,275 (Bloecher et al.); U.S. Pat. No. 4,799,939 (Bloecher et al.), and U.S. Pat. No. 5,500,273 (Holmes et al.). Alternatively, the abrasive particles may be bonded together by inter particle attractive forces.

The abrasive particle may also have a shape associated with it. Examples of such shapes include rods, triangles, pyramids, cones, solid spheres, hollow spheres and the like. Alternatively, the abrasive particle may be randomly shaped.

Abrasive particles can be coated with materials to provide the particles with desired characteristics. For example, materials applied to the surface of an abrasive particle have been shown to improve the adhesion between the abrasive particle and the polymer. Additionally, a material applied to the surface of an abrasive particle may improve the dispersibility of the abrasive particles in the binder precursor. Alternatively, surface coatings can alter and improve the cutting characteristics of the resulting abrasive particle. Such surface coatings are described, for example, in U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 4,997,461 (Markhoff-Matheny et al.); U.S. Pat. No. 5,213,951 (Celikkaya et al.); U.S. Pat. No. 5,085,671 (Martin et al.) and U.S. Pat. No. 5,042,991 (Kunz et al.), the disclosures of which are incorporated herein by reference. It is within the scope of this invention to have an abrasive article including an abrasive coating substantially free of abrasive particles. Abrasive coatings independent of whether or not they are substantially free of abrasive particles may also comprise filler particles or other additives.

Fillers

An abrasive article of this invention may comprise an abrasive coating which further comprises a filler. A filler is a particulate material with an average particle size range between 0.1 to 50 micrometers, typically between 1 to 30 micrometers. Examples of useful fillers for this invention include metal carbonates (such as calcium carbonate, calcium magnesium carbonate, sodium carbonate, magnesium carbonate), silica (such as quartz, glass beads, glass bubbles and glass fibers), silicates (such as talc, clays, montmorillonite, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide, aluminum oxide, tin oxide, titanium dioxide), metal sulfites (such as calcium sulfite), thermoplastic particles (such as polycarbonate, polyetherimide, polyester, polyethylene, polysulfone, polystyrene, acrylonitrile-butadiene-styrene block terpolymer, polypropylene, acetal polymers, polyurethanes, nylon particles) and thermosetting particles (such as phenolic bubbles, phenolic beads, polyurethane foam particles and the like). The filler may also be a grinding aid such as a halide salt. Examples of halide grinding aids include sodium chloride, potassium cryolite, sodium cryolite, ammonium cryolite, potassium tetrafluoroborate, sodium tetrafluoroborate, silicon fluorides, potassium chloride, magnesium chloride, and polyvinyl chloride. Examples of metal grinding aids include tin, lead, bismuth, cobalt, antimony, cadmium, iron, and titanium. Other miscellaneous grinding aids include sulfur, organic sulfur compounds, graphite and metallic sulfides and suspending agents.

An example of a suspending agent is an amorphous silica particle having a surface area less than 150 meters square/gram such as OX-50, sold by DeGussa Corp., Ridgefield Park, N.J. The addition of the suspending agent can lower the overall viscosity of an abrasive slurry. The use of suspending agents is further described in U.S. Pat. No. 5,368,619 (Culler), incorporated herein after by reference.

An Abrasive Composite Layer

An abrasive composite layer of this invention typically is formed from an abrasive composition comprising a plurality of abrasive particles fixed and dispersed in binder precursor, but may include other additives such as coupling agents, fillers, expanding agents, fibers, antistatic agents, initiators, suspending agents, photosensitizers, lubricants, wetting agents, surfactants, pigments, dyes, UV stabilizers and suspending agents. The amounts of these additives are selected to provide the properties desired.

The abrasive composite layer may optionally include a plasticizer. In general, the addition of the plasticizer will increase the erodibility of the abrasive composite and soften the overall binder composition. In some instances, the plasticizer will act as a diluent for the binder precursor. The plasticizer is preferably compatible with the binder precursor to minimize phase separation. Examples of suitable plasticizers include polyethylene glycol, dibutyl phthalate, alkyl benzyl phthalate, silicone oils, adipate and sebacate esters, polyols, polyols derivatives, t-butylphenyl diphenyl phosphate, tricresyl phosphate, castor oil, or combinations thereof. Phthalate derivatives are one type of preferred plasticizers.

The abrasive particle, or abrasive coating, may further comprise surface modification additives include wetting agents (also sometimes referred to as surfactants) and coupling agents. A coupling agent can provide an association bridge between the binder precursor and the abrasive particles. Additionally, the coupling agent can provide an association bridge between the binder and the filler particles. Examples of coupling agents include silanes, titanates, and zircoaluminates.

In addition, water and/or organic solvent may be incorporated into the abrasive composite. The amount of water and/or organic solvent is selected to achieve the desired coating viscosity of binder precursor and abrasive particles. In general, the water and/or organic solvent should be compatible with the binder precursor. The water and/or solvent may be removed following polymerization of the precursor, or it may remain with the abrasive composite. Suitable water soluble and/or water sensitive additives include polyvinyl alcohol, polyvinyl acetate, or cellulosic based particles.

Examples of ethylenically unsaturated diluents or monomers can be found in U.S. Pat. No. 5,236,472 (Kirk et al.), incorporated herein by reference. In some instances these ethylenically unsaturated diluents are useful because they tend to be compatible with water. Additional reactive diluents are disclosed in U.S. Pat. No. 5,178,646 (Barber et al.), incorporated herein by reference.

Abrasive Composite Structure

An abrasive article of this invention may contain an abrasive coating that is essentially smooth or having at least one abrasive composite layer that includes an array of shaped, preferably precisely shaped, abrasive composite structures. The term "shaped" in combination with the term "abrasive composite structure" refers to both "precisely shaped" and "irregularly shaped" abrasive composite structures. An abrasive article of this invention may contain a plurality of such shaped abrasive composite structures in a predetermined array on a backing. An abrasive composite structure can be formed, for example, by hardening the binder precursor while being borne on the backing and in the cavities of the production tool.

The shape of the abrasive composite structures may be any of a variety of geometric configurations. Typically the base of the shape in contact with the backing has a larger surface area than the distal end of the composite structure. The shape of the abrasive composite structure may be selected from among a number of geometric solids such as a cubic, cylindrical, prismatic, right parallelepiped, pyramidal, truncated pyramidal, conical, hemispherical, truncated conical, or posts having any cross section. Generally, shaped composites having a pyramidal structure have three, four, five or six sides, not including the base. The cross-sectional shape of the abrasive composite structure at the base may differ from the cross-sectional shape at the distal end. The transition between these shapes may be smooth and continuous or may occur in discrete steps. The abrasive composite structures may also have a mixture of different shapes. The abrasive composite structures may be arranged in rows, spiral, helix, or lattice fashion, or may be randomly placed.

The sides forming the abrasive composite structures may be perpendicular relative to the backing, tilted relative to the backing or tapered with diminishing width toward the distal end. An abrasive composite structure with a cross section that is larger at the distal end than at the back may also be used, although fabrication may be more difficult.

The height of each abrasive composite structure is preferably the same, but it is possible to have composite structures of varying heights in a single fixed abrasive article. The height of the composite structures generally may be less than about 2,000 micrometers, and more particularly in the range of about 25 to 1,000 micrometers. The diameter or cross sectional width of the abrasive composite structure can range from about 5 to 500 micrometers, and typically between about 10 to 250 micrometers.

The base of the abrasive composite structures may abut one another or, alternatively, the bases of adjacent abrasive composites may be separated from one another by some specified distance.

The linear spacing of the abrasive composite structures may range from about 1 to 12,000 composite structures/cm$^2$ and preferably at least about 50 to 75,000 abrasive composite structures/cm$^2$. The linear spacing may be varied such that the concentration of composite structures is greater in one location than in another. The area spacing of composite structures ranges from about 1 abrasive composite structure per linear cm to about 100 abrasive composite structures per linear cm and preferably between about 5 abrasive composite structures per linear cm to about 80 abrasive composites per linear cm.

The shaped abrasive composite structures are preferably set out on a backing, or a previously hardened abrasive composite layer, in a predetermined pattern. Generally, the predetermined pattern of the abrasive composite structures will correspond to the pattern of the cavities on the production tool. The pattern is thus reproducible from article to article.

In one embodiment, an abrasive article of the present invention may contain abrasive composite structures in an array. With respect to a single abrasive composite layer, a regular array refers to aligned rows and columns of abrasive composite structures. In another embodiment, the abrasive composite structures may be set out in a "random" array or pattern. By this it is meant that the abrasive composite structures are not aligned in specific rows and columns. For example, the abrasive composite structures may be set out in a manner as described WO PCT 95/22436, published Aug. 24, 1995 (Hoopman et al.). It is understood, however, that this "random" array is a predetermined pattern in that the location of the composites is predetermined and corresponds to the location of the cavities in the production tool used to make the abrasive article. The term "array" refers to both "random" and "regular" arrays.

Production Tool

A production tool is used to provide an abrasive composite layer with an array of either precisely or irregularly shaped abrasive composite structures. A production tool has a surface containing a plurality of cavities extending out of the main plane. These cavities are essentially the inverse shape of the abrasive composite structures and are responsible for generating the shape and placement of the abrasive composite structures. These cavities may have any geometric shape that is the inverse shape to the geometric shapes suitable for the abrasive composites. Preferably, the shape of the cavities is selected such that the surface area of the abrasive composite structure decreases away from the backing.

The production tool can be a belt, a sheet, a continuous sheet or web, a coating roll such as a rotogravure roll, a sleeve mounted on a coating roll, or die. The production tool can be composed of metal, (e.g., nickel), metal alloys, or plastic. The metal production tool can be fabricated by any conventional technique such as photolithography, knurling, engraving, hobbing, electroforming, diamond turning, and the like. Preferred methods of making metal master tools are described in both PCT Publication WO 97/12727 and U.S. patent application Ser. No. 08/894,978 (Hoopman), filed Sep. 3, 1997.

A thermoplastic tool can be replicated off a metal master tool. The master tool will have the inverse pattern desired for the production tool. The master tool is preferably made out of metal, e.g., a nickel-plated metal such as aluminum, copper or bronze. A thermoplastic sheet material optionally can be heated along with the master tool such that the thermoplastic material is embossed with the master tool pattern by pressing the two together. The thermoplastic material can also be extruded or cast onto the master tool and then pressed. The thermoplastic material is cooled to a nonflowable state and then separated from the master tool to produce a production tool. The production tool may also contain a release coating to permit easier release of the abrasive article from the production tool. Examples of such release coatings include silicones and fluorochemicals.

Suitable thermoplastic production tools are reported in U.S. Pat. No. 5,435,816 (Spurgeon et al.), incorporated herein by reference. Examples of thermoplastic materials useful to form the production tool include polyesters, polypropylene, polyethylene, polyamides, polyurethanes, polycarbonates, or combinations thereof. It is preferred that the thermoplastic production tool contain additives such as anti-oxidants and/or UV stabilizers. These additives may extend the useful life of the production tool. The production tool may also contain a release coating to permit easier release of the fixed abrasive article from the production tool. Examples of such release coatings include silicones and fluorochemicals.

Method for Making An Abrasive Article Having An Abrasive Composite Layer

A preferred method for making an abrasive article with one abrasive composite layer having precisely shaped abrasive composite structures is described in U.S. Pat. No. 5,152,917 (Pieper et al) and U.S. Pat. No. 5,435,816 (Spurgeon et al.), both incorporated herein by reference. Other descriptions of suitable methods are reported in U.S. Pat. Nos. 5,437,754; 5,454,844 (Hibbard et al.); U.S. Pat. No. 5,437,7543 (Calhoun); and U.S. Pat. No. 5,304,223 (Pieper et al.), all incorporated herein by reference.

A suitable method for preparing an abrasive composite layer having an array of shaped abrasive composite structures includes preparing a curable abrasive composite layer comprising abrasive particles, binder precursor and optional additives; providing a production tool having a front surface; introducing the curable abrasive composite slurry into the cavities of a production tool having a plurality of cavities; pressing a barrier coated backing against the abrasive slurry ,within the curatives of the production tool and hardening the curable abrasive composite layer before the article departs from the cavities of the production tool to form a hardened abrasive composite layer comprising abrasive composite structures.

An abrasive composite layer that is substantially free of an array of precisely shaped abrasive composite structures is made by placing a curable abrasive composite slurry on a barrier coated backing, independently of a production tool, and hardening the abrasive composite slurry to form a hardened abrasive composite layer in association with the backing. Additional abrasive composite layers may be added to an abrasive article by repeating the above steps.

The curable abrasive composite layer is made by combining together by any suitable mixing technique the binder precursor, the abrasive particles and the optional additives. Examples of mixing techniques include low shear and high shear mixing, with high shear mixing being preferred. Ultrasonic energy may also be utilized in combination with the mixing step to lower the curable abrasive slurry viscosity (the viscosity being important in the manufacture of the an abrasive article) and/or affect the rheology of the resulting curable abrasive composite slurry. Alternatively, the curable abrasive composite slurry may be heated in the range of 30 to 70° C., microfluidized or ball milled in order to mix the curable abrasive composite slurry.

Typically, the abrasive particles are gradually added into the binder precursor. It is preferred that the curable abrasive composite slurry be a homogeneous mixture of binder precursor, abrasive particles and optional additives. If necessary, water and/or solvent is added to lower the viscosity. The formation of air bubbles may be minimized by pulling a vacuum either during or after the mixing step.

The coating station can be any conventional coating means such as drop die coater, knife coater, curtain coater, vacuum die coater or a die coater. A preferred coating technique is a vacuum fluid bearing die reported in U.S. Pat. Nos. 3,594,865; 4,959,265 (Wood); and U.S. Pat. No. 5,077,870 (Millage), which are incorporated herein by reference. During coating, the formation of air bubbles is preferably minimized.

After the production tool is coated, the barrier coated backing and the next layer of curable abrasive composite is brought into contact by any means such that the next layer of curable abrasive composite slurry wets a surface of the barrier coated backing. The curable abrasive composite slurry is brought into contact with the barrier coated backing by contacting the nip roll which forces the resulting construction together. The nip roll may be made from any material; however, the nip roll is preferably made from a structural material such as metal, metal alloys, rubber or ceramics. The hardness of the nip roll may vary from about 30 to 120 durometer, preferably about 60 to 100 durometer, and more preferably about 90 durometer.

Next, energy is transmitted into the curable abrasive composite slurry by an energy source to at least partially harden the binder precursor. The selection of the energy source will depend in part upon the chemistry of the binder precursor, the type of production tool as well as other processing conditions. The energy source should not appreciably degrade the production tool or backing. Partial hardening of the binder precursor means that the binder precursor is polymerized to such a state that the curable abrasive composite slurry does not flow when inverted in the production tool. If needed, the binder precursor may be fully hardened after it is removed from the production tool using conventional energy sources.

After at least partial hardening of the abrasive composite slurry, the production tool and abrasive article are separated. If the abrasive composite slurry is not essentially fully hardened, the abrasive composite slurry precursor can then be essentially fully hardened by either time and/or exposure to an energy source. Finally, the production tool is rewound on a mandrel so that the production tool can be reused again and the fixed abrasive article is wound on another mandrel.

In another variation of this first method, the curable abrasive composite slurry is coated onto the backing and not into the cavities of the production tool. The curable abrasive composite slurry coated backing is then brought into contact with the production tool such that the slurry flows into the cavities of the production tool. The remaining steps to make the abrasive article are the same as detailed above.

It is preferred that the binder precursor is hardened by radiation energy. Radiation energy is able to penetrate most barrier coated backings and production tools. Additionally, the radiation energy source should not appreciably degrade the backing or production tool. For instance, ultraviolet light can be transmitted through a polyester backing. Alternatively, if the production tool is made from certain thermoplastic materials, such as polyethylene, polypropylene, polyester, polycarbonate, poly(ether sulfone), poly(methyl methacrylate), polyurethanes, polyvinylchloride, or combinations thereof, ultraviolet or visible light may be transmitted through the production tool and into the slurry. For thermoplastic based production tools, the operating conditions for making the fixed abrasive article should be set such that excessive heat is not generated. If excessive heat is generated, this may distort or melt the thermoplastic tooling.

The energy source may be a source of thermal energy or radiation energy, such as electron beam, ultraviolet light, or visible light. The amount of energy required depends on the chemical nature of the reactive groups in the binder precursor, as well as upon the thickness and density of the binder slurry. For thermal energy, an oven temperature of from about 50° C. to about 250° C. and a duration of from about 15 minutes to about 16 hours are generally sufficient. Electron beam radiation or ionizing radiation may be used at an energy level of about 0.1 to about 10 Mrad, preferably at an energy level of about 1 to about 10 Mrad. Ultraviolet radiation includes radiation having a wavelength within a range of about 200 to about 400 nanometers, preferably within a range of about 250 to 400 nanometers. Visible radiation includes radiation having a wavelength within a range of about 400 to about 800 nanometers, preferably in a range of about 400 to about 550 nanometers.

The resulting hardened abrasive composite layer will have the inverse pattern of the production tool. By at least partially hardening or hardening on the production tool, the abrasive composite layer has a precise and predetermined pattern.

There are many methods for making abrasive composites having irregularly shaped abrasive composites. Using the production described above, curable abrasive composite slurry is placed within the cavities of the production tool. The curable abrasive composite slurry is removed from the production tool before the slurry is hardened sufficiently. Consequently, the slurry is unable to substantially retain its shape upon removal from the production tool, thus resulting in the curable abrasive composite layer flowing and distorting the abrasive composite shape. The abrasive composite slurry is then hardened. While being irregularly shaped, these abrasive composites may nonetheless be set out in a predetermined pattern, in that the location of the composites is predetermined.

In another method of making irregularly shaped composites, the curable abrasive composite can be coated onto the surface of a rotogravure roll. The barrier coated backing comes into contact with the rotogravure roll and the curable abrasive composite wets the barrier coated backing. The rotogravure roll then imparts a pattern or texture into the curable abrasive composite. Next, the slurry/backing combination is removed from the rotogravure roll and the resulting construction is exposed to conditions to harden the binder precursor such that an abrasive composite layer is formed on the barrier coated backing. A variation of this process is to coat the curable abrasive composite onto the barrier coated backing and bring the backing into contact with the rotogravure roll.

The rotogravure roll may impart desired patterns such as a hexagonal array, ridges, lattices, spheres, pyramids, truncated pyramids, cones, cubes, blocks, or rods. The rotogravure roll may also impart a pattern such that there is a land area between adjacent abrasive composites. This land area can comprise a mixture of abrasive particles and binder. Alternatively, the rotogravure roll can impart a pattern such that the barrier coated backing is exposed between adjacent abrasive composite shapes. Similarly, the rotogravure roll can impart a pattern such that there is a mixture of abrasive composite shapes.

Another method is to spray or coat the curable abrasive composite layer through a screen to generate a pattern and the abrasive composite structures. Then the binder precursors are hardened to form the abrasive composite structures. The screen can impart any desired pattern such as a hexagonal array, ridges, lattices, spheres, pyramids, truncated pyramids, cones, cubes, blocks, or rods. The screen may also impart a pattern such that there is a land area between adjacent abrasive composite structures. This land area can comprise a mixture of abrasive particles and binder. Alternatively, the screen may impart a pattern such that the backing is exposed between adjacent abrasive composite structures. Similarly, the screen may impart a pattern such that there is a mixture of abrasive composite shapes. This process is reported in U.S. Pat. No. 3,605,349 (Anthon), incorporated herein by reference.

Method For Making An Abrasive Article Having A Make And Size Coating

A first binder precursor, commonly referred to as a make resin, is applied over the outer surface of the barrier coating provided on the backing. The first binder precursor can be applied by any conventional technique such as: roll coating, transfer coating, hot melt coating, spraying, die coating, powder coating, knife coating, curtain coating and the like. Next, the abrasive particles are projected into the first binder precursor, typically be electrostatic coating. Following this, the first binder precursor is exposed to conditions (typically an energy source as described below) to solidify or at least partially harden the binder precursor to form a binder. Next, a second binder precursor, commonly referred to a size coating resin, is applied over the abrasive particles by any conventional technique. These techniques include: roll coating, spraying, powder coating, curtain coating and the like. Following this, the second binder precursor is exposed to conditions (typically an energy source as described below) to solidify or at least partially harden the binder precursor to form a binder.

In some instances, there is a third binder precursor or supersize coating that is applied over the second binder. This third binder precursor may contain a grinding aid or a non-loading coating.

The binder precursors may comprise a free radical curable resin or condensation curable resins, such as a phenolic resin, urea formaldehyde resin or melamine formaldehyde resin.

During the manufacture, the abrasive coating precursor or binder precursor is exposed to an energy source to help initiate or accelerate the polymerization or hardening process. The energy source can be a source of thermal energy or radiation energy, such as electron beam, ultraviolet light, or visible light. The amount of energy required is dependent upon the chemical nature of the reactive groups in the binder precursor, as well as upon the thickness and density of the binder precursor coating. For thermal energy, an oven temperature of from about 50° C. to about 250° C. and a duration of from about 15 minutes to about 16 hours is sufficient. Electron beam radiation, which is also known as ionizing radiation, can be used at an energy level of about 0.1 to about 10 Mrad, preferably at an energy level of about 1 to about 10 Mrad. Ultraviolet radiation refers to radiation having a wavelength within the range of about 200 to about 400 nanometers, preferably within the range of about 250 to 400 nanometers. It is preferred that 118 to 236 Watt/cm ultraviolet lights are used. Visible radiation refers to radiation having a wavelength within the range of about 400 to about 800 nanometers, preferably in the range of about 400 to about 550 nanometers. Ultraviolet light and visible light are the preferred energy sources.

Method of Making a Barrier Coating Precursor and Coating a Backing

The barrier coating precursor is a water-borne composition prepared by mixing together a crystalline or semi-crystalline resin, a major polyfunctional crosslinking agent having acid functionality, and at least one minor polyfunctional crosslinking agent. Next, the water-borne composition is applied to a major surface of a backing by any suitable technique such as: roll coating, transfer coating, dip coating, knife coating, die coating, Meyer bar coating, spray coating, curtain coating and the like. In some instances, the water-borne composition will penetrate into the backing. In other instances, the barrier coating precursor will remain primarily on the front surface of the backing. It is generally preferred that the barrier coating precursor be coated in such a manner to result in a uniform and smooth coating. In all instances, the barrier coating is provided on the backing.

After the water-borne composition is coated, it is preferred that the construction be heated to accelerate the water removal rate. This heating aids in the polymerization of the resin which undergoes a condensation reaction forming a barrier coating.

Typically, the water-borne composition is heated for about 0.5 to 50 minutes, preferably between 1 to 10, more preferably between 1 to 5 minutes at a temperature between 80° to 150° C., typically at a temperature between 100° to 120° C. The heat or thermal energy source can be a conventional oven, convection oven, IR oven, microwave oven, or the like.

EXAMPLES

The following non-limiting examples will further illustrate the invention. All parts, percentages, ratios, etc., in the examples are by weight unless otherwise indicated. The following abbreviations listed in Table 1 are used throughout.

TABLE 1

Formulation Designations

| Designation | Description |
|---|---|
| PVA | Polyvinyl alcohol, 6 percent solids in water, sold by DuPont Corporation, Wilmington, Delaware, under the trade designation of ELVANOL 50-42 |
| MVE-MA | Methylvinylether/maleic anhydride copolymer, 3 percent solids in a 75/25 blend of methyl alcohol and water, sold by International Specialty Product (ISP), Wayne, New Jersey, under the trade designation of GANTREZ 169 |
| SF1 | Non-ionic surfactant commercially, sold by Union Carbide, Buffalo, New York, under the trade designation of TX-100 |
| DI | Deionized water |
| PA | Trimthylol-tris[beta-(N(methylazirdinyl))]-propionate), sold by Zenecca Corporation, Wilmington, Massachusetts, under the trade designation of CX-100. |
| PB1 | A C weight paper backing, sold by Kimberly Clark Corporation, Munising, Michigan, that was treated with a latex treatment to render the paper waterproof. The front surface of this paper backing had an arithmetic mean surface roughness of 143 micrometers as measured by a profilometer. |
| PB2 | A C weight paper backing, sold by Kimberly Clark Corporation, Munising, Michigan, that was treated with a latex treatment to render the paper waterproof. The front surface of this paper backing was calendered and had an arithmetic mean surface roughness of 109 micrometers as measured by a profilometer. |
| TA-THEIC | Triacrylate of tris(hydroxy ethyl) isocyanurate, sold by Sartomer Company, Exton, Pennsylvania, under the trade designation of SR368 |
| TMPTA | Trimethylolpropane triacrylate, sold by Sartomer Company, Exton, Pennsylvania, under the trade designation SARTOMER 351 |
| THFA | Tetrahydrofurfuryl acrylate, sold by Sartomer Company, Exton, Pennsylvania, under the trade designation of SR 285 |
| CA1 | A 3-methacryloxypropyltrimethoxysilane coupling agent, sold by OSI Corporation, Danbury, Connecticut, under the trade designation A-174 |
| PH1 | 2,4,6-Trimethylbenzoyl-diphenyl-phosphine oxide liquid photoinitiator, sold by BASF Corporation, Charlotte, North Carolina, under the trade designation LUCIRIN LR 8893 |
| PH2 | Isopropylthioxanthone, sold by Aceto Chemical Co., Inc., Plushing, New York, under the trade designation QUANTICURE ITX |
| SA1 | A silica suspending agent having a surface area of 150 meters square/gram, sold by DeGussa Corp., Ridgefield Park, New Jersey, under the trade name OX-50 |
| AP1 | Grade 1500 silicon carbide abrasive particles, having an average particle size of about 10.5 micrometers |

General Procedure For Making A Barrier Coated Backing

First, a barrier coating was prepared by thoroughly mixing raw materials as listed in the examples in a high shear mixer. The barrier coatings of examples A through E do not contain a minor polyfunctional crosslinking agent while the barrier coatings of examples 1 through 5 do contain a minor polyfunctional crosslinking agent, as illustrated in Table 2.

Next, a barrier precursor or a water-borne composition was applied by a Meyer rod, or coating bar, to a backing made of either PB 1 or PB2 paper as illustrated in Table 2. The samples were then essentially hardened by heating them at about 120° C. for 10 minutes.

General Procedure For Making an Abrasive Article With A Barrier Coating

First, a barrier coated backing was prepared using the above General Procedure For Making A Barrier Coated Backing.

Next, abrasive composite material (or slurry) was prepared by mixing together 25.86 parts of TATHEIC, 60.34 parts of TMPTA, 70.30 parts of THFA, 3.90 parts of CA1, 3.10 parts of PHI, 1.50 parts of PH2, 2.0 parts of SA1 and 320.0 parts of AP1, with a high shear mixer.

A production tool used was made by casting polypropylene material onto a metal master tool having a casting surface comprised of a collection of adjacent truncated pyramids. The production tool contained cavities that were in the shape of truncated pyramids. The pyramidal pattern was such that their adjacent bases were spaced apart from one another no more than about 510 micrometers. The height of each truncated pyramid was about 80 micrometers, the base was about 178 micrometers per side and the top was about 51 micrometers per side. There were about 50 lines per centimeter delineating the array of composites.

The production tool was secured to a metal carrier plate using a masking type pressure sensitive adhesive tape. The abrasive slurry was coated into the cavities of the production tool using a rubber squeegee such that the abrasive slurry completely filled the cavities. Next, the backing associated with the barrier coating was brought into contact with the abrasive slurry contained in the cavities of the production tool. A rubber roller was rolled across the back surface of the backing to ensure that the abrasive slurry wetted the surface of the barrier coating on the backing and to remove any undesired air bubbles. The article was hardened by passing the tool together with the backing and binder precursor at a speed of about 30 feet per minute under two visible light lamp "V" bulb, commercially available from Fusion Systems Inc., that each operated at about 118 Watts/cm. The radiation passed through the production tool. Upon the exposure to the ultraviolet light, the curable abrasive composite layer was essentially converted into a hardened abrasive composite layer. The abrasive composite layer was then removed from the cavities of the production tool.

Test Procedure I For Measuring the Diffusion of THFA Into A Backing

THFA, a chemical monomer, was knife coated over the outer surface of a backing associated with a barrier coating made by the General Procedure For Making A Barrier Coated Backing. After every 30 seconds, a visual inspection was made to determine if the monomer was located on the surface of the backing associated with a barrier coating or if the monomer disappeared from view by penetrating the backing.

Test Procedure II For Measuring The Release Of Hardened Abrasive Composite From A Production Tool.

Abrasive articles comprising a barrier coating were made by the above method. Upon the removal of abrasive articles from the cavities of the production tool, a visual inspection was made. The production tool was examined to determine if the hardened abrasive slurry remained with the production tool. An abrasive article having a poor release from a production tool is likely to have an abrasive coating with poor adherence to the backing. An abrasive article having a clean release from a production tool is likely to have an abrasive coating with good adherence to the backing.

EXAMPLES A–E And 1–5

The barrier coated backings of Examples B, C, and D and 1–5 were prepared by the General Procedure For Making A Barrier Coated Backing. The backing materials and the composition of the barrier coatings are illustrated in Table 2. The backings of Examples A and E were free of barrier coatings. The acronym "NA" refers to the phrase "Not Applicable". Examples B, C, and D include a barrier coating substantially free of a minor polyfunctional crosslinking agent. Examples 1–5 include PA, polyfunctional aziridine, associated with a barrier coat.

TABLE 2

Articles of Examples A-E and 1–5

| Example | Base Backing | Coating Bar # | Barrier Coating Weight (g/m$^2$) | Barrier Coating Precursor Formulation |
|---|---|---|---|---|
| A | PB2 | NA | NA | Backing Free of a Barrier Coating |
| B | PB2 | 60 | 40.0 | 36 parts PVA, 14 parts MVEMA and 0.5 parts SF1 |
| C | PB2 | 60 | 22.8 | 18 parts PVA, 7 parts MVEMA, 75 parts DI and 0.5 parts SF1 |
| D | PB2 | 60 | 17.1 | 9 parts PVA, 3.5 parts MVEMA, 87.5 parts DI and 0.5 parts SF1 |
| E | PB1 | NA | NA | Backing Free of a Barrier Coating |
| 1 | PB2 | 60 | 17.1 | 18 parts PVA, 7 parts MVEMA, 75 parts DI, 0.5 parts SF1 and 1 part PA |
| 2 | PB2 | 38 | 13.3 | 18 parts PVA, 7 parts MVEMA, 75 parts DI, 0.5 parts SF1 and 1 part PA |
| 3 | PB2 | 60 | 13.3 | 9 parts PVA, 3.5 parts MVEMA, 87.5 parts DI 0.5 parts SF1 and 1.5 parts PA |
| 4 | PB1 | 60 | 17.1 | 18 parts PVA, 7 parts MVEMA, 75 parts DI, 0.5 parts SF1 and 1 part PA |
| 5 | PB1 | 38 | 15.2 | 18 parts PVA, 7 parts MVEMA, 75 parts DI, 0.5 parts SF1 and 1 part PA |

The backings of the examples were tested to determine the diffusion rate of THFA, a component in the binder precursor, into the backings. The test was performed by using the Test Procedure I for Measuring the Diffusion of THFA Into A Backing. The results of the test are illustrated in Table 3.

TABLE 3

Diffusion of the THFA

| Example | Diffusion Time | Description |
|---|---|---|
| A | 10 to 20 seconds | Backing Free of Barrier Coating |
| B | greater than one hour | Barrier Coating without a Minor Polyfunctional Crosslinking Agent |
| C | greater than one hour | Barrier Coating without a Minor Polyfunctional Crosslinking Agent |
| D | greater than one hour | Barrier Coating without a Minor Polyfunctional Crosslinking Agent |
| E | 10 to 20 seconds | Backing Free of Barrier Coating |
| 1 | greater than one hour | Backing with Barrier Coating Including a Minor Polyfunctional Crosslinking Agent |
| 2 | greater than one hour | Backing with Barrier Coating Including a Minor Polyfunctional Crosslinking Agent |
| 3 | greater than one hour | Backing with Barrier Coating Including a Minor Polyfunctional Crosslinking Agent |
| 4 | 20 minutes | Backing with Barrier Coating Including a Minor Polyfunctional Crosslinking Agent |
| 5 | 20 minutes | Backing with Barrier Coating Including a Minor Polyfunctional Crosslinking Agent |

Barrier coatings present in abrasive articles essentially eliminate the penetration of the volatile monomer into the backing. The term "essentially eliminates" refers to the length of time (diffusion time) it takes for the THFA to penetrate the backing. Articles substantially free of a barrier coating have diffusion times of 10 to 20 seconds compared to abrasive articles with barrier coatings having diffusion times of greater than about 20 minutes. In addition, an amine associated with the barrier coating does not appear to greatly affect the THFA diffusion rate through the barrier coating.

The adherence of the abrasive coatings to backings of articles of Examples A, B, C, D, E, 1, 2, 3, 4, and 5 were determined by Test Procedure II For Measuring The Release of Hardened Abrasive Composite From a Production Tool. The result of the test is illustrated in Table 4.

TABLE 4

The Release of Hardened Abrasive Composite From a Production Tool

| Example | Release from Production Tool | Description |
|---|---|---|
| A | Good | Backing Free of Barrier Coating |
| B | Poor | Barrier Coating without a Minor Polyfunctional Crosslinking Agent |
| C | Poor | Barrier Coating without a Minor Polyfunctional Crosslinking Agent |
| D | Poor | Barrier Coating without a Minor Polyfunctional Crosslinking Agent |
| E | Good | Backing Free of Barrier Coating |
| 1 | Good | Backing with Barrier Coating Including a Minor Polyfunctional Crosslinking Agent |
| 2 | Good | Backing with Barrier Coating Including a Minor Polyfunctional Crosslinking Agent |
| 3 | Good | Backing with Barrier Coating Including a Minor Polyfunctional Crosslinking Agent |
| 4 | Good | Backing with Barrier Coating Including a Minor Polyfunctional Crosslinking Agent |
| 5 | Good | Backing with Barrier Coating Including a Minor Polyfunctional Crosslinking Agent |

Table 4 illustrates abrasive articles free of barrier coatings have good release from the production tool. Abrasive articles including barrier coatings free of a minor polyfunctional crosslinking agent have poor release from the production tool. Consequently, PA added to a barrier coating prior to the application of the abrasive coating increases release from the production tool. Good release from the production tool is defined as complete transfer of the hardened abrasive slurry from the tool to the backing. Poor release from the production tool is defined as incomplete or partial transfer of the hardened abrasive slurry from the tool to the backing. Also an 80° Folding Test Of An Abrasive Article, a test well known in the art, was also used to determine the adhesion property of the abrasive layer. A significant cracking of the abrasive layer usually occurs if there is poor adhesion of the abrasive layer while little cracking is indicative of good adhesion. The 80° Folding Test Of An Abrasive Article performed on the above Examples (B–D and 1–5) revealed that Examples 1–5 did not show any cracking or shelling, while Examples B–D did show cracking (data not shown).

The amount of volatile material emanating from an abrasive article was measured by the nose of a machine operator. The presence of volatile material is likely to result from THFA monomers having migrated into the barrier coating, or backing, and escaping hardening. The results of the Detection of Volatile Material are shown in Table 5.

TABLE 5

Detection of Volatile Material

| Example | Odor | Description |
|---|---|---|
| A | yes | Backing Free of Barrier Coating |
| B | no | Barrier Coating without a Minor Polyfunctional Crosslinking Agent |
| C | no | Barrier Coating without a Minor Polyfunctional Crosslinking Agent |
| D | no | Barrier Coating without a Minor Polyfunctional Crosslinking Agent |
| E | yes | Backing Free of Barrier Coating |
| 1 | no | Backing with Barrier Coating Including a Minor Polyfunctional Crosslinking Agent |
| 2 | no | Backing with Barrier Coating Including a Minor Polyfunctional Crosslinking Agent |
| 3 | no | Backing with Barrier Coating Including a Minor Polyfunctional Crosslinking Agent |
| 4 | No | Backing with Barrier Coating Including a Minor Polyfunctional Crosslinking Agent |
| 5 | No | Backing with Barrier Coating Including a Minor Polyfunctional Crosslinking Agent |

The odor of THFA could be detected by the machine operator when the abrasive article was prepared with a backing free of a barrier coating and could not be detected when an abrasive article was prepared with a backing associated with a barrier coating.

I claim:

1. An abrasive article having a barrier coating that essentially eliminates penetration of components of an unhardened abrasive composition into a backing, comprising:
   a backing;
   an abrasive coating formed from a composition comprising a binder precursor; and
   a barrier coating, interposed between the backing and the abrasive coating, formed from a water-borne composition comprising an essentially crystalline or semi-crystalline resin, a major polyfunctional crosslinking agent having acid functionality, and at least one minor polyfunctional crosslinking agent.

2. The abrasive article of claim 1, wherein the essentially crystalline or semi-crystalline resin is selected from the group consisting of polyvinyl alcohol, polyacrylonitrile, poly(acrylonitrile-co-styrene), poly(acrylonitrile-co-methylacrylate-co-butadiene), poly(methacrylonitrile/-co-styrene), polyvinylidene chloride, and combinations thereof.

3. The abrasive article of claim 1, wherein the at least one major polyfunctional crosslinking agent is selected from the group consisting of polymaleic acid, polystyrenesulfonic acid/maleic acid and maleic anhydride copolymers.

4. The abrasive articles of claim 1, wherein the minor polyfunctional crosslinking agent is selected from the group consisting of polyethyleneimine, polyaziridine, polyoxazoline, polyvinylpyridine, polyaniline, poly-2-ethyl-2-oxazoline, acrylate modified polyaziridine, and combinations thereof.

5. The abrasive article of claim 1, wherein the essentially crystalline or semi-crystalline resin is polyvinyl alcohol.

6. The abrasive article of claim 5, wherein the major polyfunctional crosslinking agent comprises a maleic anhydride copolymer.

7. The abrasive article of claim 6, wherein the maleic anhydride copolymer is a polyvinylmethylether-co-maleic anhydride copolymer.

8. The abrasive article of claim 7, wherein the minor polyfunctional crosslinking agent is polyaziridine.

9. The abrasive article of claim 1, wherein the binder precursor is radiation curable.

10. The abrasive article of claim 1, wherein the abrasive coating comprises abrasive particles and the abrasive coating is an abrasive composite layer comprising an array of shaped abrasive composite structures.

11. The abrasive article of claim 10, wherein the shaped abrasive composite structures are precisely shaped.

12. The abrasive article of claim 1, wherein the abrasive coating is essentially smooth.

13. The abrasive article of claim 8, wherein the abrasive coating further comprises abrasive particles.

14. An abrasive article having a barrier coating that essentially eliminates penetration of components of an unhardened abrasive composition into a backing, comprising:

a backing;

an abrasive coating formed from a composition comprising a binder precursor, abrasive particles and a volatile material; and a barrier coating, interposed between the backing and the abrasive coating, formed from a water-borne composition comprising an essentially crystalline or semi-crystalline resin, a major polyfunctional crosslinking agent having acid functionality, and at least one minor polyfunctional crosslinking agent selected from the group consisting of polyethyleneimine, polyaziridine, polyoxazoline, polyvinylpyridine, polyaniline, poly-2-ethyl-2-oxazoline, acrylate modified polyaziridine, and combinations thereof.

15. The abrasive article of claim 14, wherein the essentially crystalline or semi-crystalline resin is selected from the group consisting of polyvinyl alcohol, polyacrylonitrile, poly(acrylonitrile-co-styrene), poly(acrylonitrile-co-methylacrylate-co-butadiene), poly(methacrylonitrile/-co-styrene), polyvinylidene chloride, and combinations thereof.

16. The abrasive article of claim 14, wherein the at least one major polyfunctional crosslinking agent is selected from the group consisting of polymaleic acid, polystyrenesulfonic acid/maleic acid and maleic anhydride copolymers.

17. The abrasive article of claim 14, wherein the essentially crystalline or semi-crystalline resin is polyvinyl alcohol.

18. The abrasive article of claim 17, wherein the major polyfunctional crosslinking agent comprises maleic anhydride copolymer.

19. The abrasive article of claim 18, wherein the minor polyfunctional crosslinking agent is a polyaziridine.

20. The abrasive article of claim 14, wherein the volatile monomer is tetrahydrofurfuryl acrylate.

21. A method of making an abrasive article having a barrier coating that essentially eliminates penetration of components of an unhardened abrasive composition into a backing, comprising the steps of:

a) preparing a water-borne composition comprising essentially a crystalline or semi-crystalline resin, a major polyfunctional crosslinking agent having acid functionality, and at least one minor polyfunctional crosslinking agent;

b) applying the water-borne composition to a backing b) hardening the water-borne composition to form a barrier coating;

c) applying an abrasive composition including a binder precursor to the barrier coating; and d) hardening the abrasive composition to form an abrasive coating.

22. The method of claim 21, wherein the abrasive composition comprises abrasive particles.

23. An abrasive article having a barrier coating that essentially eliminates penetration of components of an unhardened abrasive composition into a backing, comprising:

a backing;

an abrasive coating formed from a composition comprising a binder precursor and abrasive particles; and a barrier coating interposed between the backing and the abrasive coating formed from a water-borne composition comprising a crystalline or semi-crystalline resin, maleic anhydride copolymer, and at least one minor polyfunctional crosslinking agent, selected from the group consisting of polyethyleneimine, polyaziridine, polyoxazoline, polyvinylpyridine, polyaniline, poly-2-ethyl-2-oxazoline, and acrylate modified polyaziridine.

24. An abrasive article having a barrier coating that essentially eliminates penetration of components of an unhardened abrasive composition into a backing, comprising:

a backing;

an abrasive coating comprising a binder and abrasive particles; and a barrier coating, interposed between the backing and the abrasive coating, comprising an essentially crystalline or semi-crystalline resin, a major polyfunctional crosslinking agent having acid functionality, and at least one minor polyfunctional crosslinking agent.

25. An abrasive article having a barrier coating that essentially eliminates penetration of components of an unhardened abrasive composition into a backing, comprising:

a backing;

an abrasive coating comprising a binder and abrasive particles; and a barrier coating, interposed between the backing and the abrasive coating, comprising an essentially crystalline or semi-crystalline resin, a major polyfunctional crosslinking agent having acid functionality, and at least one minor polyfunctional crosslinking agent selected from the group consisting of polyethyleneimine, polyaziridine, polyoxazoline, polyvinylpyridine, polyaniline, poly-2-ethyl-2-oxazoline, acrylate modified polyaziridine, and combinations thereof.

26. An abrasive article having a barrier coating that essentially eliminates penetration of components of an unhardened abrasive composition into a backing, comprising:

a backing;

an abrasive coating comprising a binder and abrasive particles; and a barrier coating, interposed between the backing and the abrasive coating, comprising a crystalline or semi-crystalline resin, maleic anhydride copolymer, and at least one minor polyfunctional crosslinking agent, selected from the group consisting of polyethyleneimine, polyaziridine, polyoxazoline, polyvinylpyridine, polyaniline, poly-2-ethyl-2-oxazoline, and acrylate modified polyaziridine.

* * * * *

UNITED STATES PATENT AND TRADEMARK OFFICE
CERTIFICATE OF CORRECTION

PATENT NO.    : 6,217,432 B1
DATED         : April 17, 2001
INVENTOR(S)   : Edward J. Woo It is certified that error appears in the above-identified patent and that said Letters Patent is hereby corrected as shown below:

<u>Column 5,</u>
Line 32, delete "4,769,617" and insert in place thereof -- 4,749,617 --

<u>Column 7,</u>
Line 31, delete "tetrahydrofurturyl" and insert in place thereof -- tetrahydrofurfuryl --;

<u>Column 15,</u>
Line 64, delete "5,437,7543" and insert in place thereof -- 5,437,754 --.

Signed and Sealed this

Eleventh Day of June, 2002

Attest:

Attesting Officer

JAMES E. ROGAN
*Director of the United States Patent and Trademark Office*